Patented Dec. 17, 1935

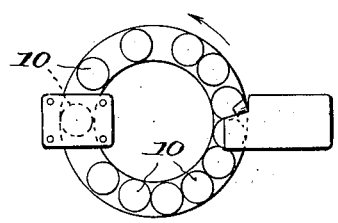
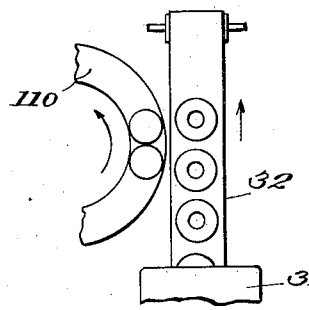
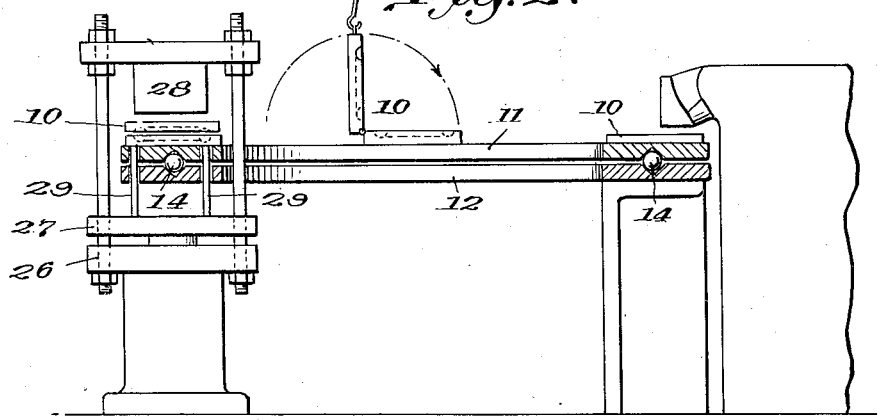
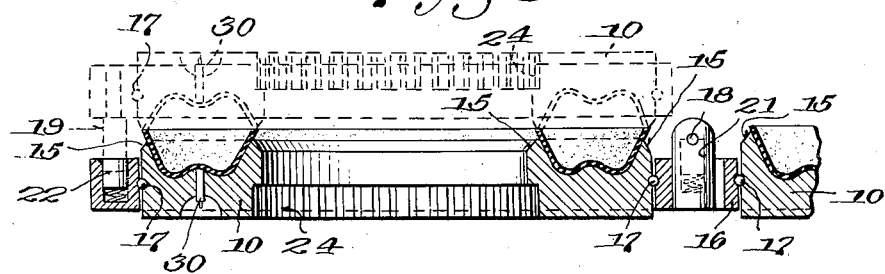
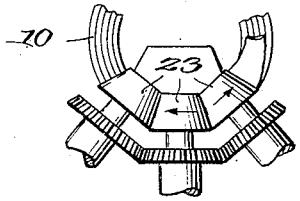

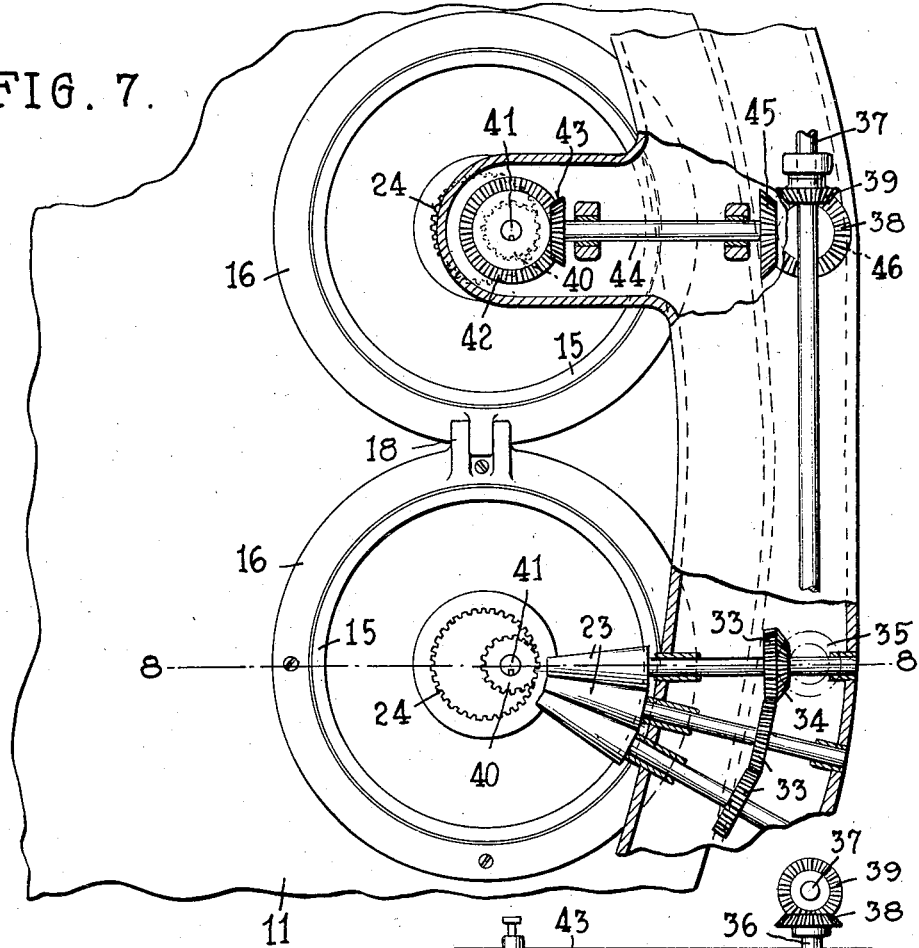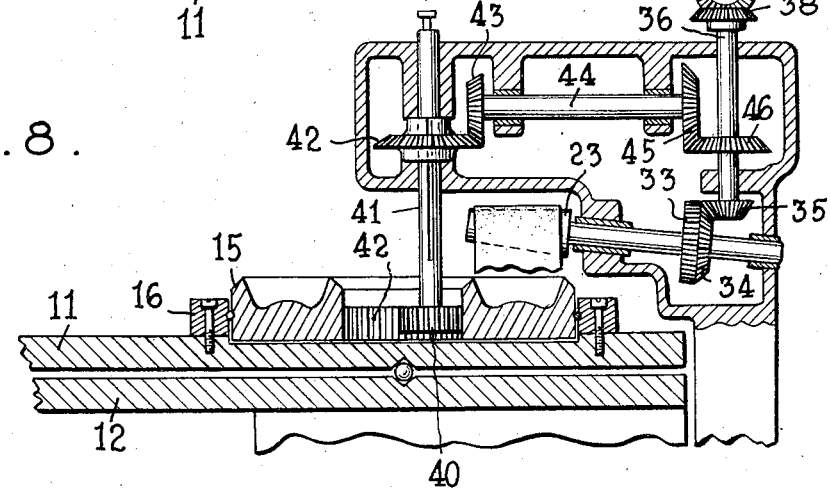

2,024,304

UNITED STATES PATENT OFFICE 2,024,304

APPARATUS FOR MAKING INNER TUBES FOR TIRES

William Wallace Potter, Pawtucket, R. I.

Application December 11, 1930, Serial No. 501,648

4 Claims. (Cl. 18—19)

The object of my invention is to speed up the production of inner tire tubes and thereby materially reduce the unit cost. In realizing or putting into practice my conception and achieving the general object just stated, I utilize an old procedure in the art in which a tube is formed or produced by putting together and uniting substantially duplicate blanks of rubber that are joined edge to edge by seams that are respectively on the inner and outer peripheries of the finished tube and I utilize this procedure by the supply of blanks of flat ring form to a series of traveling molds or forms in which opposing annular blanks are cupped with the free edges of one blank in alinement or substantial alinement with the free edges of the mating blank and then the two opposing blank edges brought together and united under pressure. The successive operations of placing blanks in molds, closing the molds, subjecting the matching blanks to pressure while in the molds and finally unloading, are performed at different stations and may be performed simultaneously so that simultaneously all four operations are going on. Obviously, great speed of production and minimum manipulations and labor are achieved by my invention. The flat annular or ring shape blanks may be formed in any desired way. Preferably they are formed so that the grain of the rubber will run in lines concentric with the blanks as that results in a stronger and otherwise better inner tube than if the grain runs in straight lines.

In the drawings:—

Fig. 1 is a plan view of apparatus for the practice of my invention;

Fig. 2 is a view thereof partly in elevation and partly in vertical section;

Fig. 3 is a detail view in vertical section on a larger scale of one of the molds shown open in full lines with the two complementary tube blanks therein, and in dotted lines shown in closed position for the action of the press to join the blank edges;

Fig. 4 is a detail top plan view of a calender roll for delivering the blanks to the molds in a curved form to give the desired concentric direction to the grain of the rubber;

Fig. 5 is a detail view in perspective showing the action of such calender rolls;

Fig. 6 is a top plan view of an embodiment of my invention by which the flat ring blanks are delivered to loading position from a calender by an endless conveyor apron.

Fig. 7 is a plan view with parts in section of the station where rubber is supplied to the molds;

Fig. 8 is a section on the line 8—8 of Fig. 7.

Describing in detail what is shown in the drawings, I place a series of similar molds, 10, in circular order upon the top of a ring-form turn table 11, which rests upon a ring-form bed, 12, that is supported by legs or standards, a height above the floor suitable for the workman. Preferably the turn table is mounted on ball bearings, 14.

Each mold, 10, consists of similar opposing members, each being of ring form and having in its face an annular depression that corresponds roughly to the cross-section of half the tire tube so that the two halves when brought together as shown in dotted lines in Fig. 3 approximate the cross-section of the periphery of the inner tube. The inner and outer peripheries of each mold member or section is an annular beveled edge, 15, beyond which the inner and outer circumferential edges of the blank placed in the cavity project so that when the two mold sections are closed as shown in dotted lines in Fig. 3, the projecting edges of the two half blanks will meet and under pressure to which they are subjected in the press and by the action of the beveled edegs, 15, they will be squeezed together and united and thus the two blank halves formed into the inner tube unite with seams on the inner and outer peripheries thereof.

Each mold section is mounted in a ring-shaped frame or cage, 16, so that each may rotate in its cage and preferably upon ball bearings, 17, when as explained more fully hereinafter, a circular blank is formed by conical calender rolls and delivered thereby directly to the mold section.

The two cages, 16, are joined by a hinge, 18, at one side so the mold may be opened to receive blanks and closed for the pressing operation. And diametrically opposite, the hinge, 18, one cage has a dowel pin, 19, to enter a matching hole 20 in the other cage when the mold sections are closed together so as to hold them rigidly in alinement especially for the ensuing pressing operation. Since the pressing operation for joining the two blank edges requires movement of one mold section towards the other, the hinge, 18, includes a spring-supported plunger, 21, and within the dowel socket, 20, is a spring-supported plunger, 22. Thus relative movement of the two mold sections towards and from each other is provided.

The place of supply of blanks or the loading position and the press are conveniently located at diametrically opposite points of the turn table and the mold closing position and the mold opening position are respectively conveniently midway between loading and pressing stations or positions. The number of molds should be four or multiples of four when there are four operative positions or stations in the apparatus.

As shown in Figs. 1 and 2, the ring-form blanks are produced and supplied to the open mold sections by the calender shown best in Figs. 4 and 5 which is made up of a plurality of side by side conical rolls, 23, which radiate from a common center (which is the center of a mold section when they are in section) between the peripheries of which a strip of rubber of suitable width is passed and thereby caused to take a curved or ring-form and as clearly shown in Figs. 4 and 5, delivered in that form directly from the last roll, 23, of the series to the mold cavity which it enters so that as shown in Fig. 3, it conforms with the more or less curved contour of that cavity with the upper edges flaring outward as before explained, and thus occupying a position most advantageous or favorable to the seaming operation in the press. During the formation of the curved blank of rubber stock and the delivery of it to the mold section, the latter rotates on its axis and preferably it is positively rotated as by being provided with internal gear teeth, 24, for engagement by a driving pinion.

The two matching sections of the same mold being supplied in succession with the curved blank, by the rotation of the turn table, they are brought to the mold closing position and the section that constitutes the upper mold section is swung on the hinge to bring it into alinement with the lower section. This operation may be performed by power as by means of a pneumatic hoist, 25, shown in Fig. 2.

From the mold closing position the closed mold by the further rotation of the turn table is brought to the closing and seaming press, 26, which is preferably a hydraulic press with a vertically movable platen, 27, situated beneath the turn table and its bed and a stationary top platen or abutment, 28, situated above the turn table and with its lower face above the upper mold section when the mold is in position for the press operation. The vertically movable platen, 27, carries several vertical posts, 29, which pass through alining holes in turn table and its bed plate so that the upper ends of said posts may engage the bottom mold section and force the two sections against the underside of the stationary upper platen, 28, and thereby bring together the opposing edges of the two tube blanks and seam them together.

After the press operation by the rotation of the turn table the mold containing the completed inner tube is moved to the unloading position, the mold opened and the completed tube removed for subsequent vulcanizing.

Each mold section has leading from the outside into its cavity a nipple, 30, with a check valve corresponding to the nipple of a tire tube and which is connected with a vacuum pump to cause the half blank when in the mold section to seat itself within the mold cavity and conform to the contour thereof. The connection between the hose of the vacuum pump and the nipples is made at the closing position or station. I have found that the half blank may be made to conform with the mold cavity without the employment of retaining grooves such as molds for the same purpose have heretofore used.

As shown in Fig. 6, the ring form blank may be delivered in flat form from a calender, 31, by an endless conveyor or apron, 32, and thereby transported to the loading position of the turn table, 110.

The specific mold rotating means forms no part of my present invention but without intending to restrict my invention to the specific details shown in Figs. 7 and 8, illustration of a suitable mold rotating means is presented in Figs. 7 and 8, and a brief description of the parts shown in Figs. 7 and 8 will be given.

The rolls 23 arranged on radial axes for delivering rubber to the mold are geared together as by bevel gears 33 on adjacent radially extending shafts so that power applied to one shaft may rotate all rolls of the group, the radial shafts being journaled in bearings in a suitable frame member of the machine. As shown, one of the bevel gears 33 is provided with a bevel gear 34 with which meshes a bevel gear 35 on a vertical shaft 36 which is driven by a horizontal shaft 37 through intermeshing bevel gears 38 and 39, the shaft 37 receiving motion from some suitable source not necessary to be shown.

Each mold half has its own set of calender rolls 23, and its own rotating mechanism, as shown in Fig. 8. In Fig. 7, however, for clearness of illustration, the calender rolls are shown with the lower mold half, and the mold rotating mechanism is shown with the upper mold half.

From the description hereinbefore given of the operation and given with especial reference to the illustration of Figs. 4 and 5, it will be seen that by the action of the group of conical calender rolls on the piece of rubber supplied thereto when the mold is at the loading station, a ring-form blank is produced and delivered by the calender rolls to the mold section. The ring-form blanks having been formed by the calender rolls and delivered to a mold in the loading station, the turntable 11 is rotated to shift such mold to the next station and to present an empty mold to the loading station for a similar procedure.

The internal gear 24 may, as shown in Figs. 7 and 8, be meshed with a driving pinion 40, on a vertical shaft 41, journaled in the machine frame above the molds and by intermeshing bevel gears 42 and 43, horizontal shaft 44 and bevel gears 45 and 46 adapted to receive motion from the shaft 36. The shaft 41 is shiftable vertically to lift the driving pinion 40 out of mesh with the internal gear 24 when the turntable is to be rotated from the loading station and to restore it to meshing engagement when the mold is to be rotated, and to enable this to be done, shaft 41 has a keyed or splined connection with the gear 42, and suitable means may be provided for lifting and lowering said shaft when necessary.

What I claim is:—

1. A mold for inner tubes comprising complementary ring form sections, a hinge connection between them permitting bodily movement of one section relative to the other independently of the hinge connection under pressure forcing one towards the other.

2. Apparatus for making inner tube comprising complementary mold sections of ring form and a support for each section with which the section is rotatably connected and calender rolls coacting with such sections.

3. A mold as in claim 1, in which the ring-form sections have oppositely placed alining pins, one of which is spring supported.

4. A mold as in claim 1 in combination with press members upon opposite sides of the ring-form sections, at least one of such press members being movable to contact with the opposed ring-form section and acts to move the same towards the other section.

WILLIAM WALLACE POTTER.